United States Patent
Church et al.

(10) Patent No.: US 11,325,058 B2
(45) Date of Patent: May 10, 2022

(54) APPARATUS AND METHOD FOR REJUVENATION AND RECOVERY OF FILTRATION MEDIA

(71) Applicants: The United States of America, as represented by the Secretary of Agriculture, Washington, DC (US); The Penn State Research Foundation, University Park, PA (US)

(72) Inventors: Clinton D. Church, Julian, PA (US); Ray B. Bryant, Spring Mills, PA (US); Peter J. Kleinman, Warriors Mark, PA (US); Alexander Nikolov Hristov, State College, PA (US)

(73) Assignees: The United States of America, as represented by the Secretary of Agriculture, Washington, DC (US); The Penn State Research Foundation, University Park, PA (US)

( * ) Notice: Subject to any disclaimer, the term of this patent is extended or adjusted under 35 U.S.C. 154(b) by 137 days.

(21) Appl. No.: 16/548,231

(22) Filed: Aug. 22, 2019

(65) Prior Publication Data

US 2020/0078707 A1 Mar. 12, 2020

Related U.S. Application Data

(60) Provisional application No. 62/727,732, filed on Sep. 6, 2018.

(51) Int. Cl.
*B01D 24/46* (2006.01)
*B01D 24/00* (2006.01)

(52) U.S. Cl.
CPC ........ *B01D 24/4668* (2013.01); *B01D 23/10* (2013.01); *B01D 2201/14* (2013.01)

(58) Field of Classification Search
CPC ............... B01D 24/4668; B01D 23/10; B01D 2201/14; B01D 24/46; B01D 35/18; B01D 2201/085
See application file for complete search history.

(56) References Cited

U.S. PATENT DOCUMENTS

| | | | |
|---|---|---|---|
| 2005/0051502 A1* | 3/2005 | Gottkehaskamp | B01D 29/74 210/777 |
| 2015/0274556 A1* | 10/2015 | Church | B01J 20/02 210/710 |

FOREIGN PATENT DOCUMENTS

EP            0253233 A2 *  1/1988  ............. B01J 20/14

* cited by examiner

*Primary Examiner* — Waqaas Ali
(74) *Attorney, Agent, or Firm* — John Fado; Robert Jones

(57) ABSTRACT

Apparatuses and methods to rejuvenate spent filtration media are described. The apparatuses include a filtration unit to filter a liquid having solids that need to be removed and a rejuvenation unit to heat the spent filtration media that has reduced filtering capacity. The methods include using the apparatus to rejuvenate spent filtration media by removing solids deposited on the filtration media to allow its repeated reuse rather than being discarded and replaced with new filtration media.

8 Claims, 2 Drawing Sheets

APPARATUS AND METHOD FOR REJUVENATION AND RECOVERY OF FILTRATION MEDIA

CROSS REFERENCE TO RELATED APPLICATION

This application claims priority to U.S. Provisional Patent Application Ser. No. 62/727,732, filed Sep. 6, 2018, the content of which is incorporated herein by reference in its entirety.

STATEMENT REGARDING FEDERALLY SPONSORED RESEARCH OR DEVELOPMENT

This invention was made with government support under Hatch Act Project No. PEN04539 awarded by United States Department of Agriculture (USDA). The government has certain rights in the invention.

FIELD OF THE INVENTION

The disclosed invention relates to processes and methods for regeneration of filtration media used in aqueous filtration applications. More specifically, the invention relates to processes and methods for rejuvenating and recovering spent filtration media used to filter primarily plant-based solids from fluids.

BACKGROUND OF THE INVENTION

Filtration processes include a variety of operations and apparatuses used in industry to separate or purify substances. One type of filtration is the separation of solids from fluids by passing a fluid containing the solids through a filtration medium that captures the solids via, for example, adsorption, absorption, adhesion, deposition, etc. and passes through a filtrate that has a reduced solids content. Filtration media (e.g., sand and gravel, kieselguhr, silica, anthracite, perlite, greensand, garnet, diatomaceous earth, cellulose, other inert porous solids, the like, and combinations thereof) are typically inert and porous is generally capable of filtering a slurry or liquid composition. Such filtration processes are used in a variety of industries and commercial applications, such as beverage-making, food preparation, drinking water, biodiesel production, pharmaceutics, paint and plastics, among others.

As an example of an inert porous filtration media, diatomaceous earth (DE) is commonly used and comprises filigree structures having high silica content of many shapes with high porosity. Its size is generally similar to fine sand and generally has a particle size ranging from less than 3 microns to more than 1 millimeter, but typically is between 10 microns to 200 microns. Among many other industrial and household uses (e.g., abrasives, polishes, mechanical insecticides, fillers, etc.), DE is used as a filtration media and/or aid in a variety of applications, such as swimming pools, drinking water, beverage manufacturing (e.g., breweries and vintners), and other applications where removal of organic solid materials from aqueous liquids is desired. The typical chemical composition of diatomaceous earth is generally 80 to 90% silica, with about 2 to 4% alumina (attributed mostly to clay minerals), and commonly 0.5 to 2% iron oxide (see e.g., Antonides, Lloyd E. (1997). Diatomite (PDF). U.S.G.S. Retrieved Dec. 12, 2010). A major disadvantage of DE is that it can be cost prohibitive due to replacement costs and a lack of processes or methods to rejuvenate or reuse spent DE.

An industrial example of DE used for a solid-liquid separation system is in animal manure treatment systems. Animal manures contain nutrients (e.g., nitrogen (N) and phosphorus (P)) as well as organic material that is beneficial to crops; however, nutrient concentrations are often too low to make transportation of bulk manures over large distances economically viable. Managing manure phosphorus has consequently become a priority concern of livestock operations, in part due to nutrient management implications with land application of manure. Concentrated livestock production occurs in many regions of the country and is associated with regional and farm-scale accumulations of phosphorous due to the nature of feed nutrients and metabolism by the animal, with manure typically containing more than two-thirds of consumed feed phosphorous (see e.g., Hristov, A. N., et al., *J. Dairy Sci.*, 89: 3702-3712 (2006)). These accumulations have, over time, created a legacy of phosphorous sources that can enrich runoff water and contribute to downstream eutrophication, the most pervasive water quality problem in the US, which accounts for about 66% of the impaired conditions of US rivers (see e.g., Carpenter, S., et al., *Ecol. Appl.*, 8: 559-568 (1998)). Compounding the impact of regional and farm phosphorous accumulations is the imperfect ratio of N and P in most livestock manures when used as a fertilizer source. Elevated concentrations of P in manure relative to N results in excess application of P to agricultural soils when manures are applied to meet crop N demand (see e.g., Sharpley, A. N., et al., *J. Env. Qual.*, 23: 437-451 (1994)). Few options are available to efficiently move manure phosphorous from areas of surfeit to areas of deficit and few options exist to adjust manure nutrient ratios to better fit crop demand (see e.g., Sharpley et al. 1994; Kleinman, P., et al., *J. Soil and Water Conserv.*, 67: 54A-61A (2012)).

A variety of approaches have been proposed to treat animal manures to reduce their potential for adverse environmental impact. Most successful has been the use of aluminum (Al), iron (Fe), and calcium (Ca) salts as manure amendments to reduce phosphorous solubility, thereby decreasing the potential of manure to enrich dissolved P in runoff water (see e.g., Moore, P. A., Jr., and D. M. Miller, *J. Env. Qual.*, 23: 325-330 (1994); Smith, D. R., et al., *J. Env. Qual.*, 33: 1048-1054 (2004); Irshad, M., et al., *Can. J. of Soil Sci.*, 92: 893-900 (2012)). Indeed, the application of alum ($Al_2(SO_4)_3$) to poultry litter has also been shown to improve the conservation of $NH_4$—N in manure due to the weak acidic properties of alum (see e.g., Moore, P. A., Jr., et al., *J. Env. Qual.*, 29: 37-49 (2000)). However, amending manures to reduce manure P solubility does not change the N:P ratio in manures and does not address the accumulation of P on farms. To achieve that objective, removal of P is necessary while conserving sufficient N to create an N:P ratio more favorable to crop production.

Low concentrations of those nutrients in manures make transportation of bulk manures over large distances economically unviable. Dairy and swine manures, for example, are typically in slurry form and must be transported in large tanks, which is inconvenient and difficult to accomplish on commercial scale. Such manure is thus typically applied to soils near where it is generated. Over time, since phosphorous is a higher conserved element relative to nitrogen and the N:P ratio in dairy manure is low, phosphorous concentrations in soils where dairy manure is applied is often in excess of crop demands. Due to increasing problems with eutrophication of streams and other water bodies, and the implication that phosphorous runoff from agricultural operations plays a major role in that eutrophication, farmers are experiencing increasing pressures and regulations to not apply animal manures to fields that are already overloaded with phosphorous. Processes for treating high-P fluids exist (e.g., U.S. Pat. No. 9,790,110) which can remove greater than 90% of the P from manures and are also scalable such that they can be used as mobile full-scale systems. While these systems often exhibit superior performance, economic improvements particularly for the solid-liquid separation phase are desired to reduce operating expenses.

There thus exists an ongoing industrial need for novel and improved processes and methods for rejuvenating and recovering spent filtration media to allow its reuse and achieve favorable economics. There exists a particular need for improved and more economical methods of rejuvenating and recovering spent filtration media used in processes for treating fluids to incentivize more widespread use of the systems and aid in preventing eutrophication and other adverse environmental impacts.

SUMMARY OF THE INVENTION

To address this need, the present invention accordingly provides apparatuses and methods for rejuvenating and recovering spent filtration media to enable its reuse to filter fluids containing organic material. The disclosed invention includes novel apparatuses and methods for rejuvenating a spent filtration medium.

In an aspect, the invention is an apparatus or system comprising an optional separation unit operable to separate suspended organic material from a liquid to create a separated liquid; an optional chemical treatment unit operable to remove at least one contaminant from the separated liquid to create a filterable liquid; a filtration unit comprising a filtration medium operable to filter the filterable liquid to create a treated effluent, wherein the filtration medium contains fine solids removed from the filterable liquid after one or more filtration cycles, and wherein the filtration medium becomes a spent filtration medium when the filtration medium has a decreased flow rate due to being loaded with an amount of said fine solids; a rejuvenation unit operable to heat the spent filtration medium to a temperature and for a time sufficient to remove at least a portion of said fine solids contained in the spent filtration medium to create a cleaned filtration medium; and a means for cooling and recovering the cleaned filtration medium for reuse in the filtration unit.

In a further aspect, the invention is a method or process for rejuvenating a spent filtration medium. The method includes providing a composition comprising a liquid having an organic material to be filtered in a filtration process. The spent filtration medium is subjected to a temperature and time sufficient to burn off an absorbed and/or adsorbed amount of the suspended organic material from the spent filtration medium, wherein the spent filtration medium comprises an inert porous filtration medium that has been used to filter the composition in the filtration process and has a decreased flow rate due to being loaded with an amount of organic material. The spent filtration medium is allowed to sufficiently cool and a rejuvenated filtration medium having at least a minimum required flow rate for reuse in the filtration process is recovered.

It is an advantage of the invention to provide novel apparatuses and methods to rejuvenate and recover spent filtration media and facilitate its reuse.

It is another advantage of the present invention to provide novel apparatuses and methods to rejuvenate and recover spent inert and porous filtration media and facilitate its reuse.

It is an additional advantage of the present invention to provide novel apparatuses and methods to rejuvenate and recover spent diatomaceous earth filtration media and facilitate its reuse.

It is a further advantage of the present invention to provide processes and methods to treat spent filtration media in the treatment of high-P fluids and improve cost efficiency by facilitating repeated reuse of the filtration media.

It is yet another advantage of the present invention to provide processes and methods to treat animal manure containing high amounts of phosphorous in a cost-effective fashion through reusing spent filtration media via a novel rejuvenation and recovery process.

An additional advantage of the invention is to provide apparatuses and methods to reduce costs related to the filtration of liquids in a variety of industries including beverage-making, food preparation, drinking water, biodiesel production, pharmaceutics, and paint and plastics production.

Another advantage of the present invention is to provide apparatuses and methods to concentrate and recover P from spent filtration media after one or more cycles of reusing rejuvenated filtration media.

This summary is provided to introduce a selection of concepts in a simplified form that are further described below in the detailed description. This summary is not intended to identify all key or essential features of the claimed subject matter, nor is it intended to limit the scope of the claimed subject matter.

DETAILED DESCRIPTION OF THE INVENTION

Figure 1:
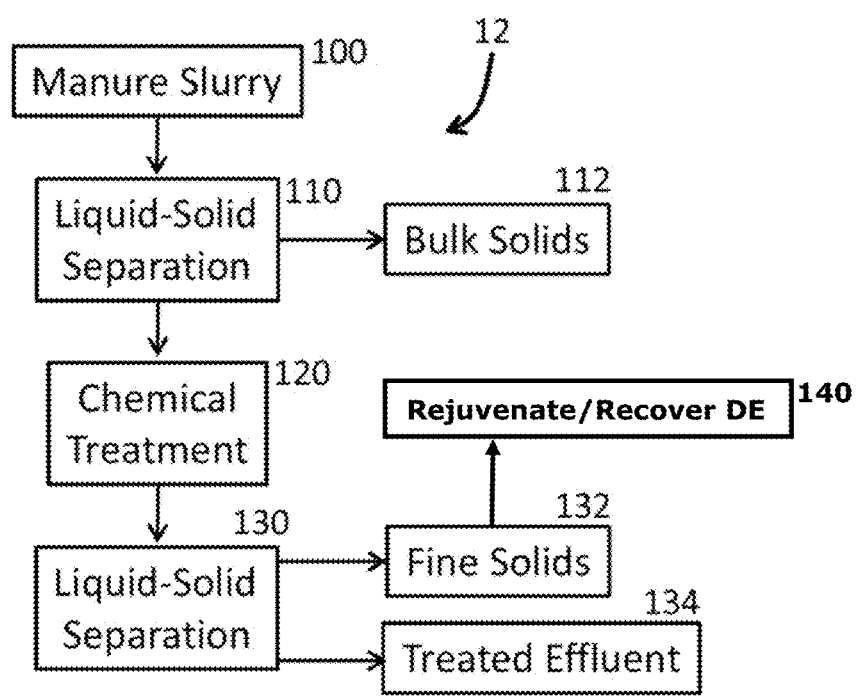
FIG. 1 illustrates an embodiment of the apparatus and/or method of the invention for treating a fluid depicted as a flowchart.

Unless herein defined otherwise, all technical and scientific terms used herein generally have the same meaning as commonly understood by one of ordinary skill in the art to which this invention belongs. The definitions herein described may or may not be used in capitalized as well as singular or plural form herein and are intended to be used as a guide for one of ordinary skill in the art to make and use the invention and are not intended to limit the scope of the claimed invention. Mention of trade names or commercial products herein is solely for the purpose of providing specific information or examples and does not imply recommendation or endorsement of such products.

As used in the description of the invention and the appended claims, the singular forms "a," "an," and "the" are intended to include the plural forms as well, unless the context clearly indicates otherwise.

The term "consisting essentially of" excludes additional method (or process) steps or composition components that substantially interfere with the intended activity of the method (or process) or composition and can be readily determined by those skilled in the art (for example, from a consideration of this specification or practice of the invention disclosed herein). This term may be substituted for inclusive terms such as "comprising" or "including" to more narrowly define any of the disclosed embodiments or combinations/sub-combinations thereof. Furthermore, the exclusive term "consisting" is also understood to be substitutable for these inclusive terms.

The term "filtration medium" refers to any medium or mixture of media capable of filtering a slurry or liquid composition and able to withstand the temperatures used in the disclosed invention (e.g., sand, gravel, kieselguhr, silica, perlite, greensand, garnet, diatomaceous earth, vermiculite, mineral filtration media, other inert porous solids, the like, and combinations thereof).

The term "fluid" refers to substances including pure liquid (i.e., a liquid without any solids present) and a liquid containing coarse and/or fine solids (e.g., a slurry). The fluid may, for example, contain animal manure (e.g., dairy manure, swine manure, chicken manure with or without added water mixed to form a slurry), or acid whey from a yogurt manufacturing facility. For example, fluids also may include beverages (e.g., wine, beer, juices, etc.), oil from fryers, drinking or potable water, biodiesel treatment steps, pharmaceutical compositions (e.g., filtration of antibiotics and other active enzymes, proteins, contaminants, etc.), paint and plastics (e.g., purification of latex and other organic plastics), food products (e.g., syrups, sugar, honey, etc.).

The term "high-P fluid" refers to any fluid that has a phosphorous content that is higher than desired. For example, a fluid may have a higher phosphorous content at the beginning of the process disclosed herein and a lower relative phosphorous content at a later stage or end of the process.

The term "optional" or "optionally" means that the subsequently described element, event, or circumstance may or may not be present or occur, and that the description includes instances and embodiments in which said event or circumstance occurs and instances where it does not. For example, the disclosed separation unit may optionally include one mechanism or more than one mechanism to separate solids from the fluid, such as a press to remove bulk solids and a centrifuge to remove medium solids.

The term "spent filtration medium" refers to any filtration medium or mixture of filtration media that has been used to filter a composition or fluid and needs replacement or rejuvenation due to the accumulation of fine solids (e.g., organic materials whether they are plant-based, petroleum based, synthetic, etc.) and/or other contaminants along with a decrease in flow through the filtration medium causing it to become clogged or plugged, including fresh filtration media, rejuvenated filtration media, and/or combinations thereof that has been used in a number of cycles sufficient to require the filtration media to undergo a rejuvenation process to facilitate its reuse.

The present invention provides novel apparatuses and methods for rejuvenating and recovering spent filtration media. Filtration media becomes "spent" when a sufficient volume of fluid is filtered through it such that organic materials in the fluid are removed by the filtration media which then loses its ability to flow additional fluid at a desired flowrate due to becoming clogged or plugged with organic materials removed from the fluid. The invention is particularly suited for rejuvenating and recovering spent filtration media that can withstand high temperatures (e.g., sand, gravel, kieselguhr, silica, perlite, greensand, garnet, diatomaceous earth, vermiculite, mineral filtration media, other inert porous solids, the like, and combinations thereof) and may be used for a variety of spent filtration media. The disclosed rejuvenation and recovery apparatuses and methods could be used for virtually any filtration process that used such filtration media, for example, where the solids removed from the filtered fluids were primarily organic in nature and susceptible to removal from the filtration media using the methods herein described. It should be appreciated that the acceptable rate of filtration or fluid throughput is dependent on the type of fluid being filtered and commonly related to the economic value of the fluid or product being filtered versus the cost of filtration. For example, filtration processes used in filtering fluids having organic solid contaminants (e.g., manure slurries, acid whey, other fluids) requires filtration media that is generally capable of flowrates between of about 10 gallons per minute to about 25 gallons per minute through a filter surface area of, for example, 113 square feet. In this case, the fluid throughput is from about 0.09 to about 0.22 gallons per minute per square foot. Much lower flow rates (e.g., lower by an order of magnitude or more) may be acceptable for other materials, such as pharmaceutical compounds, and a moderate flowrate may be desirable for materials such as beverages. The particular desired flowrate for a certain application may be maintained by a skilled artisan by ensuring filtration media is rejuvenated and recycled as needed in the filtration process. Spent filtration media may be rejuvenated in batches, continuous cycles, or in its entirety. The preferred method is to remove an amount of spent filtration media from the filtration process in batches while maintaining an amount of rejuvenated or fresh filtration media in the filtration process to ensure acceptable throughput. Such removal may occur "on the fly" without stopping ongoing and/or subsequent filtration cycles or one or more filtration cycles may be intermittently paused to remove and replace spent filtration media.

In embodiments, filtration media (e.g., a single type of filtration media, fresh filtration media, rejuvenated/recycled filtration media, different types of mixed filtration media, etc.) is continually available in the filtration system as spent filtration media is removed. In an embodiment, the filtration unit or system is a drum-style unit (e.g., Autovac as described below) and spent filtration media is essentially continuously removed (e.g., scraped off of the drum with a knife or scraper) as the filtration system is operated. In this embodiment, the overall flow rate does not appreciably diminish because the spent filtration media and filtered organic materials are removed by a knife or scraping mechanism as the drum rotates, leaving a fresh surface of filtration media to filter additional fluid. In embodiments, fluid containing contaminants to be filtered is resting in a tray underneath the drum and the drum having the filtration media "scoops" the fluid and captures the organic material. For example, a layer of filtration medium (e.g., about 1 to about 6 inches thick—about 10 to about 5,000 lbs, or about 100 lbs, or about 300 lbs, or about 500 lbs, or about 1,000 lbs, etc.) may be initially placed on the drum and then the knife or scraping mechanism slowly moves closer to the drum as it rotates to remove layers (e.g., totaling from about 1 inches in thickness to about 6 inches of thickness) of the filtration medium (and filtered organic materials or solids) over a period of about 5 to about 12 hours. The knife or scraper may have an adjustable mechanism (e.g., mechanical clicking advance mechanism) and be set to advance at a rate determined by the operator (e.g., from about $1/4000$ to about $10/4000$, or about $24/4000$, or about $60/4000$ of one inch) with each rotation or partial rotation of the drum. The rate of advance determines the rate and total thickness of the removed layers and would be calculated by a skilled artisan to accommodate the characteristics of the fluid being filtered.

When the filtration media is used for a period of time, the flowrate is reduced due to the saturation of the filtration media with filtered solids. In embodiments with a rotating drum filtration unit, flow reduction may be avoided with the proper rate of scraping of spent filtration media. In embodiments with flow-through filtration units, for example, the flow rate is decreased as fluids are filtered. When the flows reach a lower limit of about 50% of the initial flow rate, the filtration media is generally considered spent and ready to be subjected to the processes of the invention for rejuvenation and recovery to be reused in the same filtration process or a different filtration process. The filtration media would be considered clogged or plugged when the flow rate falls below about 50% to about 10% or 20% of the initial flow rate and would be ready for rejuvenation prior to becoming clogged or plugged to avoid efficiency disruptions to the filtration process. It should be appreciated that a skilled artisan would take action to maintain a designated level of throughput depending upon the application. For example, in a filtration process where a manure slurry is the filtered fluid the filtration media may be nearly or fully clogged or plugged with a single filtration cycle (e.g., a single rotation of a drum for drum-style filtration units or a certain volume of slurry depending upon the available filtration surface area) thereupon requiring rejuvenation and recovery. In other embodiments, the filtration media is used a plurality of cycles before requiring rejuvenation and recovery. Upon undergoing rejuvenation and recovery in the disclosed methods, the rejuvenated filtration media is capable of flowing at least 50% to about 100% of a comparable fresh filtration media and preferably at least about 75% to about 100%. As discussed herein, higher flow rates for rejuvenated media may be achieved via acid washing after heating the spent filtration media. A means for acid washing may be included in the apparatus or method of the invention in the first rejuvenation cycle or in any subsequent rejuvenation cycle as determined for the application by the operator. For example, filtration media may maintain about 100% of its original flow rate upon one or two rejuvenating heating cycles, drop to about 75% after a third heating cycle, and drop to about 55% after a fourth heating cycle. An acid washing step introduced after, for example, the fourth heating cycle may increase the flow rate of the rejuvenated filtration media to about 75%, about 85%, or about 100% of the initial filtration media flow rate.

In embodiments, the disclosed apparatuses and methods for rejuvenating and recovering spent filtration media may be used as part of a system for treating fluids containing high amounts phosphorous (i.e., a high-P fluid). A system for treating a high-P fluid, slurry, stream, etc., can include an optional first liquid-solid separator station or unit that is operable to remove solids having a particle size equal to or greater than about 30 µm (e.g., equal to or greater than 30 µm) and produce a fluid with a fine solids stream. This first separation unit may include one or a plurality of separation systems, such as a press (e.g., auger or screw press, available, for example, from Neptune Enterprises, Richland Center, Wis.) to remove larger solids and a centrifuge (e.g., decanter centrifuge available from Sharples P-3400, Alfa Laval, Lund Sweden) to remove medium-sized solids. This initial liquid-solid separation can be done in either one or a plurality stages, depending upon the intended use of the solids as well as the solids content of the fluid, but it is critical that the overall initial mechanical separation process removes particles larger than about 30 micrometers diameter from the liquid effluent for the following chemical treatment to be effective.

The system also may include a chemical treatment station or unit that is operable to, for example, chemically treat and transform the majority (e.g., equal to or greater than about 50%, or about 75%, or about 90%, or preferably equal to or greater than about 95%) of dissolved P (e.g., orthophosphate) in the fine solids stream into a solid P form that is removable through exposure to a filtration medium. In embodiments, the chemical treatment may be performed in batches (e.g., in batch-mode tanks) and/or the chemical treatment(s) may be injected or applied into a stream leaving the first separation unit. Various types of chemical treatment systems (e.g., one or more of ferric sulfate, acid mine drainage residual, geothite, aluminum chlorohydrate, aluminum sulfate, calcium hydroxide, ferric chloride) and mechanisms may be used according to alternative embodiments (see e.g., U.S. Pat. No. 9,790,110). Also, the system can have a second liquid-solid separator having at least one filtration station or unit having a filtration medium that is operable to remove the solid P form and any other fine solids equal to or greater than about 1 micrometer to less than about 30 micrometers (e.g., up to about 10, or 20, or 25 micrometers) from the chemically treated fine solids stream. In this example system, the processes and/or methods allow for dissolved N to be carried through the system in the liquids and thereby be left as a beneficial use as a liquid fertilizer for crops. In other embodiments, one or more chemical methods and/or filtration methods may be used to remove any constituents present (e.g., dissolved minerals, N, and/or organics) in the liquid stream.

In embodiments, the rejuvenation and recovery processes and methods of the invention may be applied as part of a process for treating high-P fluid including providing a high-P containing stream (e.g., manure slurry, acid whey in the yogurt-making industry wastewater), chemically treating said high-P stream such that a majority of dissolved P in the stream is transformed into a solid form via sorption of P onto particles placed or precipitated within said stream, and removing the solid form containing P from the chemically treated fine solids stream by exposure to at least one filtration medium. Preferably, at least about 90% of the total P is removed from the high-P fluid. Upon exposure to a volume of the stream containing the solids, the filtration medium begins to become clogged and decreases flow. When the flow reaches a lower limit dependent on the particular fluid being filtered as further discussed herein, the filtration media is considered spent and subjected to the apparatuses, methods, and/or processes of the invention for rejuvenation and recovery to be reused in the same filtration process or a different filtration process. For example, replacing or rejuvenating the filtration media is generally an economic decision based on the relative cost of the product compared to the energy or resource cost to provide pressure to force the liquid through the filter and the cost of replacing/rejuvenating the filtration media itself.

Particular examples of filtration media used in industry include filtering out primarily organic solids where the disclosed rejuvenation and recovery systems and processes would be applicable. For example, beverage making (e.g., wine, beer, juices, other beverages where clarification is desirable); deep fryer oil filtration; drinking water; biodiesel pretreatment processes of unrefined oils and in the final polishing step; pharmaceuticals for the filtration of antibiotics and other active enzymes, proteins, and contaminants; paint and plastics to purify latex and other organic plastics; foods such as syrups, sugar, and honey without removing or altering their color, taste, or nutritional properties; and other applications. DE and perlite, for example, have the desirable characteristics of packing fairly tightly together (regulated by the average size of the particles) but not so tightly that it creates extremely small pore spaces between the particles to ensure adequate fluid and liquid throughput. The unique shapes of the individual particles (e.g., tiny seashells in the case of DE) that prevent the kind of tight packing that, for example, sand particles of the same average size would display, gives it an almost unique ability to act as a filter. These jagged edges also give DE (and others filtration media like perlite) an ability to lock together (e.g., analogous to the way the teeth of a zipper lock together) so that they stay in place on a filtration unit (e.g., rotating drum). Though sand particles may be used in some embodiments, sand particles do not stick together, and as such, would not stay on the drum rotating in a bath of fluid like "stickier" filtration media such as DE and perlite.

FIG. 1 illustrates an embodiment of the apparatus, system, method, and/or process 12 for treating a fluid to remove suspended organic solids of various sizes and other contaminants from the fluid. System 12 is intended to depict embodiments for apparatuses operable to carry out the described processes as well as methods of treating fluids and may be used either in its entirety or in a format with, for example, only the rejuvenate/recovery 140 component, or the liquid-solid separation 130 (i.e., filtration unit) component combined with the rejuvenate/recovery 140 component, or the chemical treatment 120 component combined with the foregoing with or without an additional liquid-solid separation 110 component for removing larger solids. In embodiments, the filtration unit may include an additional separation unit such as a centrifuge.

Though a variety of fluids as further described herein may be treated with system 12, FIG. 1 depicts an embodiment treating a slurry in the form of animal manure (e.g., dairy, beef, swine, poultry, etc.) 100. The process 12 includes providing a manure slurry 100. The initial slurry or composition may be any slurry or composition, for example, raw manure, acid whey, or a slurry collected in a holding area such as a lagoon or any type of holding tank. A liquid-solid separation step 110 (e.g., at least one of centrifugation, decanter centrifugation, auger press, screw press, the like, and combinations of two or more of the foregoing) is generally performed as the first step of process 12 when larger solid particles are present in the fluid. It should be appreciated that liquid-solid separation step 110 is optional and may be performed when suspended solids equal to or greater than, for example, about 30 micrometers (e.g., equal to or greater than 30 μm) in diameter are present in the manure slurry, and in some instances equal to or greater than about 25 micrometers (e.g., equal to or greater than 25 μm), in diameter are removed (if needed due to the nature of the fluid) from a slurry and a resultant fine solids stream is produced. The removal of the solids equal to or greater than about 25 μm to about 30 μm in diameter can also include removal of bulk solids (e.g., solids having a particle size equal to or greater than about 5 mm), for example using a screw or auger press. The slurry may first be passed through an auger press or remain in a settling tank to remove bulk solids followed by centrifugation to remove intermediate solids. The bulk solids may also be composted for future use, for example, as bedding material for livestock. These larger to intermediate sized solids are depicted as bulk solids 112 in FIG. 1. In addition, the bulk solids can be blended at a later stage with the intermediate solids to produce a conveniently transportable fertilizer or for other uses. For example, in farms that use composted manures as bedding for cows, these bulk solids are a low-P beneficial use product that can be left on the farm while the higher-P intermediate solids are removed by the centrifuge. In alternative embodiments, one skilled in the art could opt to use two or more machines for the initial liquid-solid separation, instead of just using a larger capacity centrifuge, which could remove both bulk and intermediate solids. The initial liquid-solid separation 110 can be done in either one, two, or more stages, depending upon the intended use of the solids, but for embodiments where a chemical treatment step takes place it is critical that this initial step leaves only particles smaller than about 30 micrometers diameter in the liquid effluent for the following chemical treatment to be effective.

After separation of at least a portion of the solids in the manure slurry as detailed above, the remaining manure slurry is chemically treated at step 120. It is generally necessary to have the solids in the fluid to be smaller than about 25 μm to about 30 μm before the fluid is chemically treated to ensure adequate conditions for chemical treatment to be effective, though different types of chemical treatments may be optimized with varying particle size. In embodiments where an object of the process is to remove P from the slurry, for example, the fine solids stream is chemically treated such that a majority (e.g., equal to or greater than about 90%; preferably equal to or greater than about 95%) of dissolved P in the stream is transformed via sorption, coagulation, chelation, or the like into a solid form so that the filtration unit may capture the solidified form. In some embodiments the chemical treatment may also be designed to remove a lower amount of the target, such as about 50% or about 75%. The level of removal would be adjusted by a skilled artisan to a desired level for the particular circumstances. This treatment can be done, for example, in batch mode in tanks or could be accomplished by injecting the chemicals into the liquid stream. Thereafter, the solid form containing the P and any additional fine solids equal to or greater than about 1 μm (e.g., equal to or greater than about 0.5, 1, or 2 μm) are removed from the chemically treated fine solids stream by subjecting to an additional liquid-solid separation step 130 which results in a treated effluent component and a fine solids/filtration media component. Liquid/solid separation step 130 includes passing the remaining slurry through a filtration medium. The treated effluent 134 is essentially free of fine solids 132.

The fine solids 132 are absorbed and/or adsorbed onto or physically contained with the filtration medium component in liquid-solid separation step 130. The filtration medium may be any one or a combination of a variety of different filtration media used in the art. This liquid-solid separation 130 removes the fine solids (e.g., those between about 0.5 and about 25 micrometers diameter). Though other technology could be selected for this step by a skilled artisan, a preferred filtration unit to use in this step which simultaneously yields a dry stackable solid is a drum-style filtration unit such as an AutoVac unit manufactured by ALAR Engineering Corporation (Mokena, Ill.).

In embodiments, a spent filtration medium from liquid-solid separation step 130 is subjected to a rejuvenation and recovery process to allow reuse of the spent filtration medium (e.g., at a flow rate before (or when) the filtration medium is clogged or plugged). An apparatus and/or process is used to rejuvenate and recover the spent filtration medium for re-use as further described herein. In short, this procedure includes optionally drying the spent filtration medium followed by subjecting the spent filtration medium to an indicated temperature (e.g., ashing or incinerating the spent filtration medium). The higher temperature ashing process will not be effective until the spent filtration media is dry, and if the spent filtration media is initially exposed to the higher temperature process prior to drying it will take longer as the water is removed before the ashing begins. The higher temperature rejuvenation step cannot take place until all of the water is gone, but any furnace could do this by simply making the cycle longer. Washing the ashed filtration medium with an acidic solution after the ashing step is optional; however, it often further improves performance of the rejuvenated filtration medium upon reuse. Generally, without an acid washing step the flow rate of successive regenerations of filtration media decreases. However, by using an acid-wash after, for example, the 3rd, 4th, and subsequent regeneration cycles, the filtration media can then be used again, for an additional 3, 4, or more filtration cycles. By including an acid wash step the filtration media can be reused for many subsequent cycles and in some cases may be reused indefinitely and may also provide the additional surprising advantage in certain embodiments of recovering additional P in a concentrated form.

The optional drying step within step 140 includes subjecting the spent filtration medium to a temperature ranging from about 50° C. to about 110° C. for a time ranging from about 10 hours to about 96 hours. The drying temperature is preferably from about 85° C. to about 105° C., or from about 95° C. to about 100° C. The drying time is preferably from about 8 hours to about 16 hours, though longer or shorter drying times may be used to accommodate for the level of moisture present in the spend filtration medium. The optional drying at elevated temperature is to speed the subsequent higher temperature phase up by getting most of the water out of the spent filtration media and specific drying temperature and time may be adjusted depending on the particular circumstances such as relative humidity, surface area available for spreading the spent filtration media, and other factors.

The dried (or optionally not dried) filtration media is then subjected to a heating process within step 140 to burn off deposited organic materials. The temperature for the heating process may range from about 500° C. to less than about 1,400° C., preferably from about 500° C. to about 800° C., more preferably from about 525° C. to about 700° C., and most preferably in the range of about 550° C. to about 600° C. Lower temperatures help to conserve energy in the heating process (e.g., less than 1,000° C.) and the maximum temperature used should not exceed a temperature that would damage the filtration medium (e.g., the main component of DE is silica which has a melting temperature of about 1,500° C.—temperatures beyond this level would not work as it would alter the physical structure of the DE). In general, it should be appreciated that higher temperatures require less time, but the time needed at various temperatures is also a function of the amount of spent filtration media being rejuvenated (i.e., more media generally requires longer time), and whether the media is in a static pile or are "blended" by mechanical stirring or tumbling in a drum dryer (e.g., rotary kiln) while being exposed to the heat. For example, at a temperature of 550° C., a static pile of 5 lb s of spent DE filtration media containing manure solids can be regenerated in about 2 hours but may be held at a high temperature (e.g., about 550° C. for about 4 hours) to ensure thoroughness. Higher temperatures (and active blending or agitation) will generally shorten the time and larger batches will generally lengthen the time, especially if the spent filtration media is in a static pile.

The optional acid washing step may be with one or with a mixture of hydrochloric and nitric acids (i.e., aqua regia) and may include a single wash or a series of successive washes. Alternatively, other acids as a mixture or individually may be used, including nitric acid, hydrochloric acid, sulfuric acid, phosphoric acid, the like, and any dilution of the foregoing. A sufficient amount of acid must be provided to ensure the entire volume of incinerated spent filtration media is well-wetted. In general, the more acid used, as well as the stronger the acid used, will increase the unexpected extraction of P from high P spent filtration media solids. However, the amount of acid used should also be minimized for economic (e.g., less acid to be neutralized in the concentrated recovered P) as well as environmental reasons. Preferred ratios of acid:ashed filtration medium are between about 10:1 and about 1:10, or about 5:1 to about 1:5, or about 1:1. For example, successive acid washes may be performed at a 1:1 ratio using 50% hydrochloric acid rather than a single 10:1 wash using the same acid, thus cutting acid costs and neutralization by about 70%. An advantage to including the acid washing step is to permit reuse of rejuvenated filtration medium for a greater number of cycles than in the absence of an acid washing step as well as the unexpected advantage of recovering concentrated P from high P fluids.

Subjecting the spent filtration medium to the heating process and the optional acid washing process creates a cleaned filtration medium. In embodiments, the cleaned filtration medium may then be cooled and recovered for reuse in a filtration process. Cooling may be performed, for example, by leaving the cleaned filtration media at ambient temperature or might be performed by an active cooling process such as refrigeration or other cooling mechanism.

For example, DE filtration medium used in a process for filtering a liquid or slurry containing plant-solids (e.g., manure slurry, acid whey from a yogurt manufacturing facility, or other fluids) comprising solid filtered material (e.g., derived from an AutoVac® unit manufactured by ALAR Engineering Corporation (Mokena, Ill.)) may be dried at 105° C. for 24 to 48 hours when its flow rate decreases to a level such that it is considered spent filtration medium for the particular fluid being filtered by a skilled artisan (e.g., after one cycle in a drum-style filtration unit). This initial drying step is optional and may or may not be performed depending on the thermal capacity of the furnace used in the subsequent heating step. In embodiments, the initial drying step may be performed by exposing the spent filtration medium to a naturally warm environment such as under the sun. Thereafter, the dry DE is subjected to a temperature of 550° C. for 4 hours (e.g., ashing or incineration process) to remove carbon (e.g., filtered plant-based materials) which was removed from the filtered liquid and deposited on the DE filtration medium to regenerate the DE and convert it into a reusable form. Improved performance of the regenerated DE may occur in certain cases by further washing it in an acidic solution. Various acids may be used in this washing step, such as nitric, hydrochloric, sulfuric, the like, and any combination or dilution thereof. This acid wash may be employed at a range of weight basis ratios as further discussed herein.

In embodiments, a pump may be used to move the fluid through the systems or methods of the invention. In other embodiments, gravity or pressure in the fluid stream moves the fluid. Particulates, organic matter, or other components (e.g., precipitated or coagulated) may also be removed during one or more steps of the methods or in one or more stages or units of the system or apparatus. For example, fluid is generally pumped to each component of the system and allowed to gravity drain out of that component into a tank located beneath. The liquid is pumped to the next component, until it is ultimately discharged from the filtration unit 130. A mixing tank may also be used to add chemicals in certain embodiments where the pumping flow is interrupted or diverted, and the fluid is both pumped into and out of that tank after chemicals are mixed.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurement. The following examples are intended only to further illustrate the invention and are not intended in any way to limit the scope of the invention as defined by the claims.

Example 1

Figure 2:
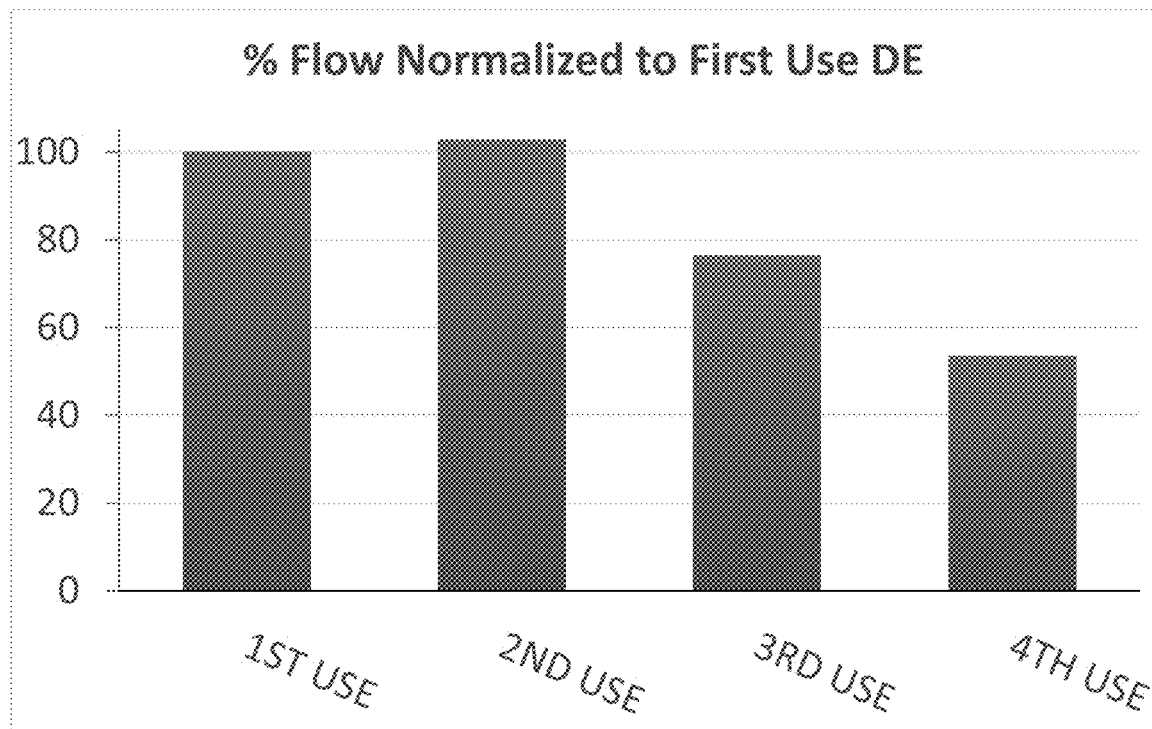
FIG. 2 graphically illustrates the percent flow rate of diatomaceous earth filtration media in successive uses of the filter media, normalized to the flow rate of the first use of fresh diatomaceous earth.

In this example, it was surprisingly discovered the spent DE filtration media can be rejuvenated and recovered for reuse. It was found that the final solids (which contain DE and fine manure solids) can be incinerated and that the resulting ash can then be directly reused at least three times without appreciably lowering the mean flow rate (FIG. 2: 1st use=0.22 gpm, 2nd use=0.23 gpm, 3rd use 0.17 gpm, 4th use 0.12 gpm) through the filtration media or its ability to remove precipitated (or coagulated, chelated, etc.) P and other fine solids from the manure, thus greatly lowering the overall costs of using systems to remove P and other fine solids from manure. All or a majority of the decreased flow rate observed with subsequent heat rejuvenated was surprisingly recoverable by employing an acid washing step.

One of the concerns with ashing and reusing the filtration media was that the P and other fine solids recovered from each successive use of the DE might be in water soluble form, and therefore require the use of a greater concentration of chemicals to subsequently remove it from the stream when DE was used in subsequent cycles. This was surprisingly found to not be the case, but rather, excess P was recovered and retained in the ashed solid DE, and furthermore, that P can later be stripped from the DE in a concentrated form by simple acid washing after several uses of the DE as a filtering agent, and then converted into a highly concentrated form of P fertilizer.

Samples were subjected to Kjeldahl digestion for N (i.e., Total Kjeldahl Nitrogen or TKN) and EPA 3050B extraction for P. Briefly, for P determination, solids were extracted following a modified EPA Standard Method 3050B (Kimbrough, D. E., & Wakakua, J. R. (1989) *Env. Sci. and Tech.* 23, 898) with aqua regia and hydrogen peroxide. Following dilution to final volumes and filtration (Whatman No. 1), P analysis was then performed using an inductively coupled optical emission spectrophotometer (ICP-OES, Varian). An acid washing procedure was also performed by washing the ashed DE in a 50% solution of HCl at a 1:10 (weight basis) ratio. Following dilution to final volumes and filtration (Whatman No. 1), P analysis was then performed using an inductively coupled optical emission spectrophotometer (ICP-OES, Varian). Results are shown in Table 1. This surprising and unexpected level of rejuvenation and recovery allows multi-cycle reuse of the DE to achieve lower daily operating costs of P-removal systems by more than 60 percent (e.g., 2.5 cents per gallon treated compared to the previous 6.25 cents per gallon treated).

TABLE 1

Phosphorus Concentration in Heated Diatomaceous Earth Filtration Media

| Filtration Media Times Used | EPA3050B (mg/kg) Mean(StdErr)n | HCl Extract (mg/kg) Mean(StdErr)n |
|---|---|---|
| 1 | 3660(12)4 | 3493(56)4 |
| 2 | 5619(47)3 | 5609(16)4 |
| 3 | 7761(137)4 | 7691(5)4 |
| 4 | 10960(356)4 | 10825(50)4 |

The results show the surprising advantages of the invention by demonstrating the further concentration and recovery of P during the acid washing process after several (e.g. three, four, or more) cycles of reusing the rejuvenated DE to remove P from the high-P fluids filtered. After 4 uses of the DE as a filter aid, essentially all of the P from the multiple uses can be stripped at one time by an acid wash, and then, after neutralization, provide a more concentrated fertilizer, either in liquid form immediately, or in solid form after drying of the neutralized wash solution. Alternatively, nitric acid could be used instead of hydrochloric to wash the DE after 4 uses, and then use potassium hydroxide to neutralize the acid, to arrive at an aqueous solution of NPK (similar to commercial fertilizer).

These results demonstrate that the P builds up in the DE during successive cycles, and that it can be removed by acid washing. This data also shows that the P from successive cycles is not water soluble, but is acid soluble, since the DE was subjected to being drenched in water during the successive filtration steps. Furthermore, this acid washing step also rejuvenates the DE such that it restores its ability to filter at flow rates comparable to fresh DE.

Example 2

This example further illustrates the effectiveness for reuse of filtration media after ashing of filtration media and fine solids and shows that the resulting solution could be used directly or be dried into a solid NPK fertilizer as well. An ashing procedure was used to recover the DE filtrate material for re-use as filtration media on the AutoVac®. In short, this procedure involved drying the DE filtrate overnight at about 90° C., followed by ashing the dried filtrate for about 4 hours at about 550° C. in a muffle furnace (Thermolyne 30400 Furnace, Barnstead International, Dubuque, Iowa). These samples were then subjected to digestion per EPA 3050B, and then the total P and total K content of the samples were determined by ICP-OES (data not shown). After four cycles of using and ashing the DE, the DE was subjected to an acid washing procedure in a 50% (1:1) solution of HCl of HNO$_3$. The DE batch was washed four times with the acid solution followed by a rinse with de-ionized water to remove excess acid. The ratio of acid needed for the first wash was determined by the amount required to cover the ashed DE by about 1 inch. For subsequent acid washes, 5 L of 50% solution of HNO$_3$ was used (1:1.25), which was equivalent to the volume decanted. After each addition of acid the solution and ashed DE were mixed thoroughly and allowed to settle prior to decanting off the wash solution. Equilibration times for each wash were: wash 1-120 hr, wash 2-15 hr, wash 3 and 4-4 hrs, water rinse-72 hrs. Wash solutions and the final rinse were combined and subsampled for neutralization with 8M KOH prior to digestion by EPA 3050B for total P and K by ICP-OES, and by Kjeldahl digest N (TKN) for total N (Gallaher et al., 1976, *Soil Sci. Soc. Am. J.* 40, 887-889). Similar results were found using HCL (data not shown). It was further found that, if 1:1 nitric acid was used for the acid wash procedure, and the subsequent wash water was neutralized with KOH, the wash water could be converted into a beneficial form of low-P liquid fertilizer that contained roughly 32,000 mg $L^{-1}$ N, 212 mg $L^{-1}$ P, and 6800 mg $L^{-1}$ K. In common fertilizer terms, in which N is reported as % N, but P and K are reported as % $P_2O_5$ and % $K_2O$, respectively, this was equivalent to a liquid fertilizer with values of 3.2-0.05-0.82 (for % N-% $P_2O_5$-% $K_2O$).

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety, including any materials cited within such referenced materials. In addition to the citations above, the contents of the following references are also incorporated herein by reference in their entirety: US 2015/0274556. Furthermore, the invention encompasses any possible combination of some or all of the various embodiments and characteristics described herein and/or incorporated herein. In addition, the invention encompasses any possible combination that also specifically excludes any one or some of the various embodiments and characteristics described herein and/or incorporated herein.

The amounts, percentages and ranges disclosed herein are not meant to be limiting, and increments between the recited amounts, percentages and ranges are specifically envisioned as part of the invention. All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10 including all integer values and decimal values; that is, all subranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. As used herein, the term "about" refers to a quantity, level, value, or amount that varies by as much as 30%, preferably by as much as 20%, and more preferably by as much as 10% to a reference quantity, level, value, or amount.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims. Although any methods and materials similar or equivalent to those described herein can be used in the practice or testing of the present invention, the preferred methods and materials are herein described. Those skilled in the art may recognize other equivalents to the specific embodiments described herein which equivalents are intended to be encompassed by the claims attached hereto.

The claimed invention is:

1. A method for rejuvenating a spent filtration medium, the method comprising: (a) providing a composition comprising a liquid having an organic material to be filtered in a filtration process, wherein the filtration process comprises; (b) filtering the composition at least once through a filtration medium operable to filter the liquid to create a treated effluent, wherein the filtration medium contains fine solids removed from the liquid after one or more filtration cycles, and wherein the filtration medium becomes a spent filtration medium when the filtration medium exhibits a decreased flow rate due to being loaded with an amount of said fine solids; wherein the spent filtration medium is selected from the group consisting of perlite and diatomaceous earth (c) burning off an amount of the fine solids from the spent filtration medium; (d) allowing the spent filtration medium to cool; (e) washing the spent filtration medium with an acid solution having a concentration of 50% or greater; and (f) recovering a rejuvenated filtration medium having an increased flow rate (relative to the decreased flow rate exhibited in step (b)) for reuse in the filtration process.

2. The method of claim 1, wherein the composition comprises a manure slurry.

3. The method of claim 1, wherein the composition has a phosphorous content.

4. The method of claim 1, wherein the rejuvenated filtration medium comprises the diatomaceous earth and is further mixed with new diatomaceous earth for reuse to filter the composition in the filtration process.

5. The method of claim 1, wherein the rejuvenated filtration media is capable of flowing at least 75% of a comparable fresh filtration medium.

6. The method of claim 1 wherein the acid is selected from the group consisting of nitric acid, hydrochloric acid, sulfuric acid, and any combination of the foregoing.

7. The method of claim 1, wherein the composition comprises a liquid stream of high phosphorous content and further comprising chemically treating the liquid stream of high phosphorous content such that a majority of dissolved phosphorous in the stream is transformed into a solid form via sorption of dissolved phosphorous onto particles placed or precipitated within the stream to create a solid form containing phosphorous, and removing the solid form containing phosphorous from the chemically treated liquid stream by exposure to at least one filtration medium.

8. The method of claim 1, wherein the liquid stream comprises animal manure.

* * * * *